United States Patent
Sabripour et al.

(10) Patent No.: US 10,360,478 B2
(45) Date of Patent: Jul. 23, 2019

(54) SYSTEMS AND METHODS FOR INLINE OBJECT DETECTION USING A HUE SATURATION VALUE

(71) Applicant: MOTOROLA SOLUTIONS, INC., Chicago, IL (US)

(72) Inventors: Shervin Sabripour, Plantation, FL (US); Scott M. Alazraki, Davie, FL (US); Melanie A. King, Hollywood, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 10 days.

(21) Appl. No.: 15/622,724

(22) Filed: Jun. 14, 2017

(65) Prior Publication Data

US 2018/0365526 A1    Dec. 20, 2018

(51) Int. Cl.
*G06K 9/00* (2006.01)
*G06K 9/62* (2006.01)
*G06K 9/46* (2006.01)

(52) U.S. Cl.
CPC ....... *G06K 9/6267* (2013.01); *G06K 9/00771* (2013.01); *G06K 9/4642* (2013.01); *G06K 9/4652* (2013.01)

(58) Field of Classification Search
CPC ............. G06K 9/6267; G06K 9/00711; G06K 9/4642; G06K 9/4652
See application file for complete search history.

(56) References Cited

U.S. PATENT DOCUMENTS

| | | |
|---|---|---|
| 7,496,228 B2 | 2/2009 | Landwehr et al. |
| 2013/0156299 A1 | 6/2013 | Zhang et al. |
| 2014/0032458 A1 | 1/2014 | Sinyavskiy et al. |
| 2015/0243050 A1* | 8/2015 | Kaneko .............. G06T 5/002 382/165 |
| 2018/0039864 A1* | 2/2018 | Yao .................. G06K 9/38 |

OTHER PUBLICATIONS

"Wang et al., A Highly Efficient System for Automatic Face Region Detection in MPEG Video, Aug. 1997, IEEE transactions on circuits and systems for video technology, vol. 7, No. 4, pp. 615-628" (Year: 1997).*

(Continued)

*Primary Examiner* — Ping Y Hsieh
(74) *Attorney, Agent, or Firm* — Michael Best & Friedrich LLP

(57) ABSTRACT

A system and method for inline object detection using hue saturation value. One method includes determining, with an electronic processor running a single object classifier, a hue saturation value range. The method includes receiving a digital image including an object. The method includes detecting, without reloading the single object classifier, a macroblock from the digital image, the macroblock associated with the object. The method includes determining a target region within the macroblock. The method includes determining a quantity of pixels in the target region having a hue saturation value within the hue saturation value range. The method includes, when the quantity of pixels exceeds a threshold, completing object classification of the macroblock.

20 Claims, 6 Drawing Sheets

(56) References Cited

OTHER PUBLICATIONS

Shaik et al., "Comparative Study of Skin Color Detection and Segmentation in HSV and YCbCr Color Space," specification (2015) ScienceDirect, Procedia Computer Seience 57 pp. 41-48 http://www.sciencedirect.com/science/article/pii/S1877050915018918.
Emami, "Color-based Blob Detection, Detecting Objects as Colored Blobs using HSV Colors," Internet article (2010) 6 pages, http://shervinemami.info/blobs.html.
Viola et al, "Rapid Object Detection Using a Boosted Cascade of Simple Features" specification (2001) pp. 1-9, Cambridge, USA.

\* cited by examiner

SYSTEMS AND METHODS FOR INLINE OBJECT DETECTION USING A HUE SATURATION VALUE

BACKGROUND OF THE INVENTION

Public safety personnel patrolling or responding to an incident in an area may need to locate a suspect, a missing person, a stolen vehicle, or other persons or objects of interest. In some cases (for example, in a large or crowded area), manual visual scanning may not be sufficient to locate an object of interest. Accordingly public safety personnel may use mobile media devices (for example, a body worn camera, a drone or a vehicle-mounted device such as an in-vehicle dash camera), which capture images of the area to assist them in locating objects of interest. For example, captured video images may be analyzed using multiple-object classifiers, multiple single object classifiers, or single object classifiers combined with post filtering to identify objects of interest in video images. In some cases, it is desirable to locate a person or object of interest based on a particular color (for example, a crime suspect wearing a red shirt). Quick and accurate identification of an object of interest can improve outcomes for public safety patrol and response efforts.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
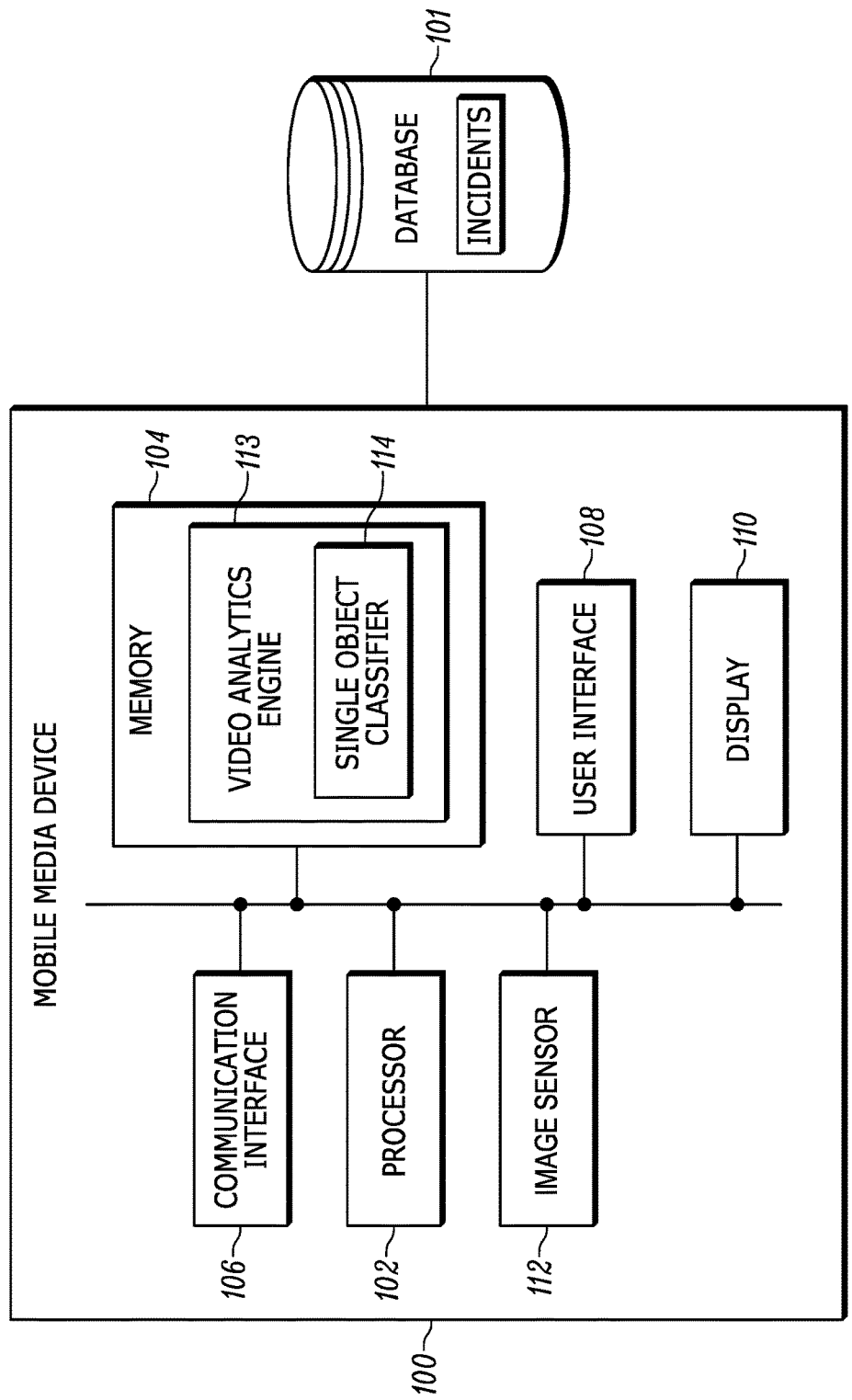
FIG. 1 is a diagram of a mobile media device in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel may use mobile media devices to capture images and analyze images to assist them in locating objects of interest. Some mobile media devices implement real-time object identification using video analytic engines, which utilize classifiers, neural networks, and the like to detect and identify objects. A classifier is a machine learning-based software tool (for example, a neural network) trained to detect an object in an image or a series of image. For example, a face detection classifier is generated by providing a neural network with a training data set of numerous positive images (images of faces) and negative images (images without faces). Once sufficiently trained, the classifier may then be used to detect objects in other images. Classifiers may be implemented as multi-object classifiers and single-object classifiers.

Public safety personnel may use such classifiers to analyze video to locate objects of interest. For example, a police officer patrolling a crowd may be dispatched to look for a male suspect wearing an orange shirt. The police officer may use a mobile media device, such as a body-worn camera, to aid in his or her search. The body-worn camera captures video images of the crowd, and analyzes those images using classifiers to detect a male human wearing an orange shirt (for example, using face detection).

Multi-object classifiers are trained to detect multiple objects having multiple variations within the field of view of a frame. For example, a multi-object classifier may be trained to detect many face and shirt color combinations. A classifier may look for male faces wearing blue, orange, white, yellow, red, or other colored shirts. However, multi-object classifiers must, by their nature, make more comparisons and perform more feature extractions. They transverse more conventional layers as part of the neural network and are therefore more computationally-complex and intensive, takes a longer time to detect a particular object of interest. Multiple-object classifiers may also result in a high rate of false positive detections.

In contrast, single object classifiers are trained to detect only one object. Single classifiers are thus quicker than multi-object classifiers, but are only able to detect the one single object they are trained to detect. If a classifier is trained to detect a male face wearing a blue shirt, it will not detect a female face wearing a blue shirt or a male face wearing an orange shirt. When using single object classifiers, multiple single classifiers must be trained and available for loading in order to look for more than one object of interest. This increases the time required to locate an object, especially when a new object of interest is identified. For example, if a police officer is looking for a suspect wearing an orange shirt, and is then informed that the suspect may be wearing a blue jacket now, a new classifier must be loaded.

In some instances, a single object classifier may be combined with a post-filter to locate an object of interest among multiple objects of the same type, based on a particular description or feature, for example, a color. For example, a single object classifier may locate ten faces in a crowd, and the post-filtering may be performed on the faces to look for an orange shirt. However, this technique is computationally intensive and more time consuming than single object detection, because the classifier likely will detect many objects that do not match the object of interest, and another process iteration is applied to parse the distinction between similar objects of interest. This post filtering adds time and CPU cycles on top of the detection process.

Accordingly, embodiments described herein provide for a single object classifier that is available at the edge of a communication network such as on a mobile media device used by an emergency responder that enables the emergency responder to quickly and accurately detect and identify objects of interest. Some of the methods provided herein are capable of detecting large regions of a desired color, to small "blobs" of color, providing a more efficient and fast method as compared to the multi-object classifier, multiple single object classifier, and single object classifier with post-filtering methods described above.

One example embodiment provides a method for inline object detection. The method includes determining, with an electronic processor running a single object classifier, a hue saturation value range. The method includes receiving a digital image including an object. The method includes detecting, without reloading the single object classifier, a macroblock from the digital image, the macroblock associated with the object. The method includes determining a target region within the macroblock. The method includes determining a quantity of pixels in the target region having a hue saturation value within the hue saturation value range. The method includes, when the quantity of pixels exceeds a threshold, completing object classification of the macroblock.

Another example embodiment provides a mobile media device. The mobile media includes an electronic processor. The electronic processor is configured to provide a single object classifier. The electronic processor is configured to determine a hue saturation value range. The electronic processor is configured to receive a digital image including an object. The electronic processor is configured to detect, without reloading the single object classifier, a macroblock from the digital image, the macroblock associated with the object. The electronic processor is configured to determine a target region within the macroblock. The electronic processor is configured to determine a quantity of pixels in the target region having a hue saturation value within the hue saturation value range. The electronic processor is configured to, when the quantity of pixels exceeds a threshold, complete object classification of the macroblock.

Another example embodiment provides a non-transitory computer-readable medium including instructions executable by an electronic processor to perform a set of functions. The set of functions includes determining, with the electronic processor running a single object classifier, a hue saturation value range. The set of functions includes receiving a digital image including an object. The set of functions includes detecting, without reloading the single object classifier, a macroblock from the digital image, the macroblock associated with the object. The set of functions includes determining a target region within the macroblock. The set of functions includes determining a quantity of pixels in the target region having a hue saturation value within the hue saturation value range. The set of functions includes, when the quantity of pixels exceeds a threshold, completing object classification of the macroblock. The set of functions includes when the quantity of pixels does not exceed the threshold, discarding the macroblock.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components.

FIG. 1 is a diagram of a mobile media device 100 in accordance with some embodiments. In the example illustrated, the mobile media device 100 includes an electronic processor 102, a memory 104, a communication interface 106, a user interface 108, a display 110, and an image sensor 112. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. The mobile media device 100 is presented as an example that may be programmed and configured to carry out the functions described herein. In some embodiments, the mobile media device 100 may be a handheld device or a wearable device. For example, the mobile media device 100 may be a portable communication device, such as, for example a portable two-way radio including a camera, a body-worn camera, a smart telephone, a tablet computer, and the like. In some embodiments, components of the mobile media device 100 may be separately implemented, and may be communicatively coupled by a bus or by a suitable communication network. For example, the mobile media device 100 may include a dash camera in a vehicle coupled to a mobile two-way radio, a network-connected portable computer, or similar device in or coupled to the vehicle. It should be understood that, in other constructions, the mobile media device 100 includes additional, fewer, or different components than those illustrated in FIG. 1.

As illustrated in FIG. 1, in some embodiments, the mobile media device 100 is communicatively coupled to, and writes data to and from, a database 101. The database 101 may be a database housed on a suitable database server communicatively coupled to and accessible by the mobile media device 100. In alternative embodiments, the database 101 may be part of a cloud-based database system accessible by the mobile media device 100 over one or more networks. In some embodiments, all or part of the database 101 may be locally stored on the mobile media device 100. In some embodiments, as described below, the database 101 electronically stores data on incidents (for example, incident reports created by a law enforcement agency). In some embodiments, the database 101 is part of a computer-aided dispatch system.

The electronic processor 102 obtains and provides information (for example, from the memory 104 and/or the communication interface 106), and processes the information by executing one or more software instructions or modules, capable of being stored, for example, in a random access memory ("RAM") area of the memory 104 or a read only memory ("ROM") of the memory 104 or another non-transitory computer readable medium (not shown). The software can include firmware, one or more applications, program data, filters, rules, one or more program modules, and other executable instructions. The electronic processor 102 is configured to retrieve from the memory 104 and execute, among other things, software related to the control processes and methods described herein.

The memory 104 can include one or more non-transitory computer-readable media, and includes a program storage area and a data storage area. The program storage area and the data storage area can include combinations of different types of memory, as described herein. The memory 104 may take the form of any non-transitory computer-readable medium. In the embodiment illustrated, the memory 104 stores, among other things, a video analytics engine 113. The video analytics engine 113 analyzes video (and other media) to, among other things, identify and detect objects, shapes, motion, and the like within the video. The video analytics engine 113 includes a classifier 114 (described in detail below), which the video analytics engine 113 utilizes for object detection. In some embodiments, the video analytics engine 113 includes other features, for example, neural networks, for object detection and video analysis.

The communication interface 106 may include a transceiver for wirelessly coupling to wireless networks (for example, land mobile radio (LMR) networks, Long Term Evolution (LTE) networks, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed network architectures. Alternatively, or in addition, the communication interface 106 may include a connector or port for receiving a connection to a wired network (for example, Ethernet).

The user interface 108 operates to receive input from, for example, a user of the mobile media device 100, to provide system output, or a combination of both. The user interface 108 obtains information and signals from, and provides information and signals to, (for example, over one or more wired and/or wireless connections) devices both internal and external to the mobile media device 100. Input may be provided via, for example, a keypad, a microphone, soft keys, icons, or soft buttons on the display 110, a scroll ball, buttons, and the like. System output may be provided via the display 110. The display 110 is a suitable display such as, for example, a liquid crystal display (LCD) touch screen, or an organic light-emitting diode (OLED) touch screen. The mobile media device 100 may implement a graphical user interface (GUI) (for example, generated by the electronic processor 102, from instructions and data stored in the memory 104, and presented on the display 110), that enables a user to interact with the mobile media device 100. In some embodiments, the mobile media device 100 operates or is integrated with a head-mounted display (HMD) or an optical head-mounted display (OHMD).

The image sensor 112 is an image capture device for capturing images by, for example, sensing light in at least the visible spectrum. The image sensor 112 communicates the captured images to the electronic processor. It should be noted that the terms "image" and "images," as used herein, may refer to one or more digital images captured by the image sensor 112, or processed by the electronic processor 102, or displayed on the display 110. Further, the terms "image" and "images," as used herein, may refer to still images or sequences of images (for example, a video stream).

Figure 2:
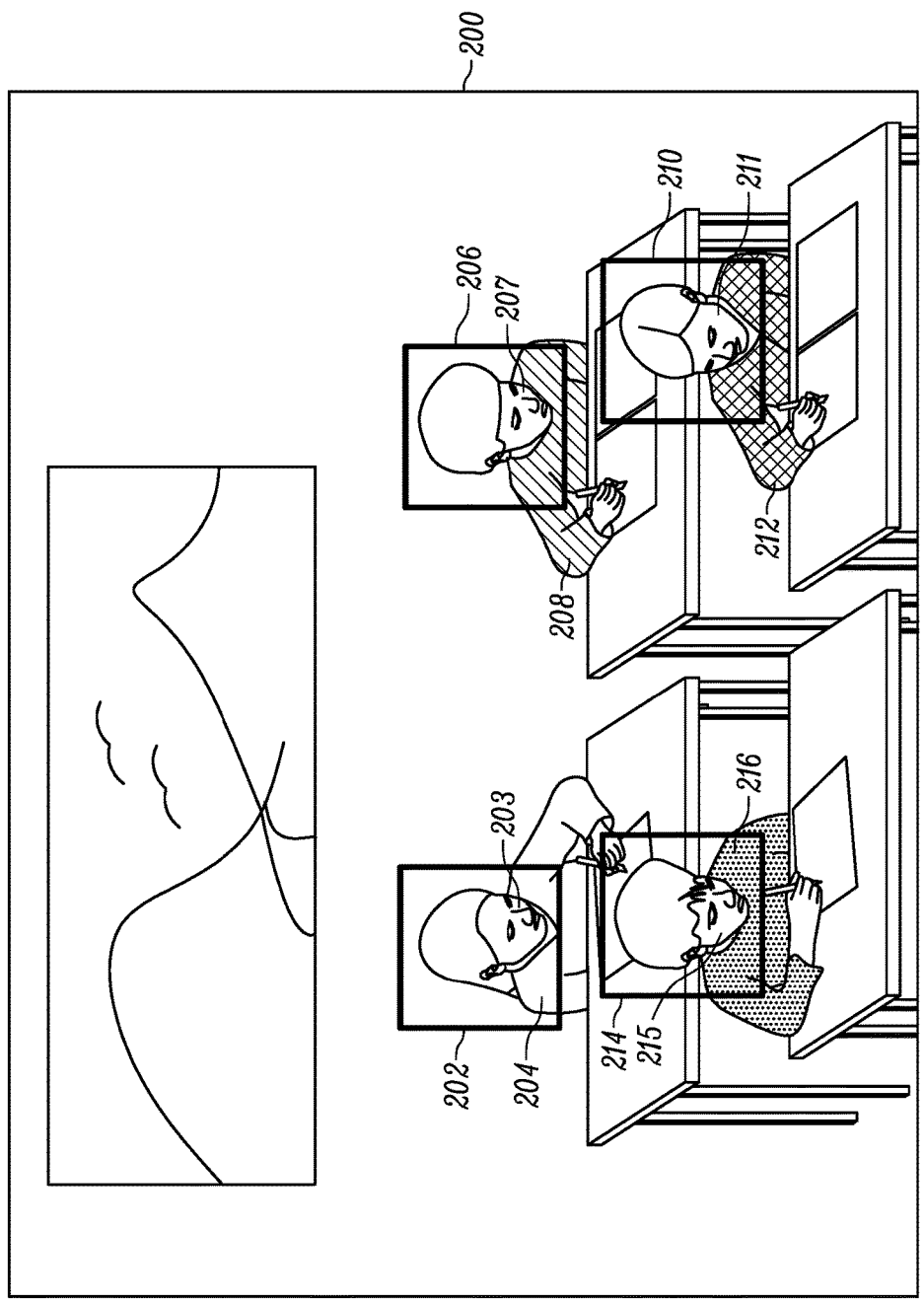
FIG. 2 illustrates a sample input image received by the mobile media device of FIG. 1 in accordance with some embodiments.

FIG. 2 illustrates one example of an image 200 received by the mobile media device 100. The image 200 includes macro-blocks 202, 206, 210 and 214, each including a face. Macro-block 202 includes a face 203 of a person wearing a white shirt 204. Macro-block 206 includes a face 207 of a person wearing a blue shirt 208. Macro-block 210 includes a face 211 of a person wearing a yellow shirt 212. Macro-block 214 includes a face 215 of a person wearing an orange shirt 216. As an example, the image 200 depicts students in a classroom setting. The systems and methods described herein may also be used with images of other settings that include one or more persons or objects such as, for example, settings of a sidewalk or a street, or objects such as entire bodies, vehicles, weapons, backpacks, and the like.

Figure 3:
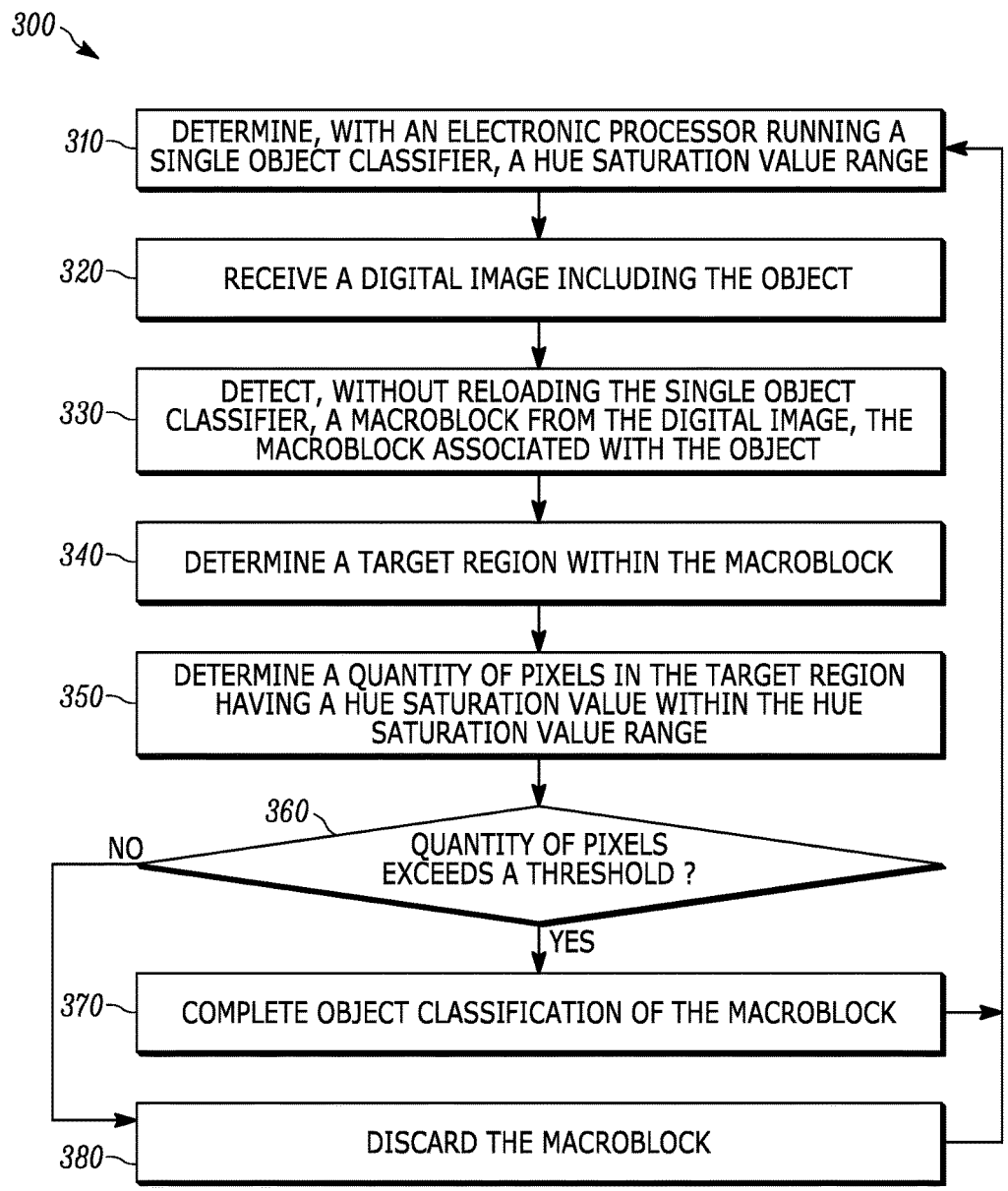
FIG. 3 is a flow chart of a method of detecting an object in accordance with some embodiments.
Figure 4:
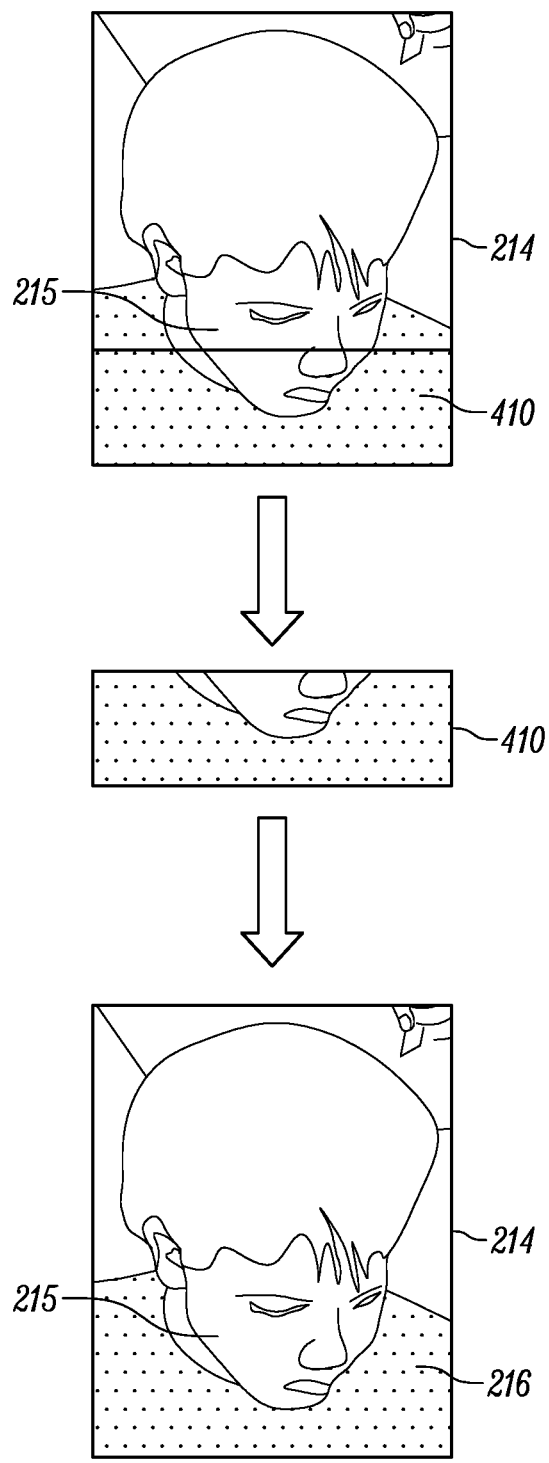
FIG. 4 illustrates a flow diagram for the identification of an object in accordance with some embodiments.

FIG. 3 illustrates an example method 300 for inline object detection using a hue saturation value. As an example, the method 300 is explained in terms of the mobile media device 100 capturing and analyzing the image 200 of FIG. 2 to detect an object of interest, namely a person who is wearing an orange shirt. As described in detail below, the method 300 detects the object of interest by detecting a face and, prior to completing the detection of the face, performing a hue saturation value to detect the orange shirt. The method 300 is described with respect to FIG. 4, which illustrates the identification of one or more macro-blocks within the image 200. The method 300 is described as being performed by the mobile media device 100 and, in particular, the electronic processor 102 executing the video analytics engine 113 and the single object classifier 114. However, it should be understood that in some embodiments, portions of the method 300 may be performed by other devices, including for example, a computer located in a public safety vehicle and wirelessly coupled to the mobile media device 100. It should also be understood that in some embodiments, portions of the method 300 may be used to detect other objects of interest besides a face and perform a hue saturation value to detect other target regions.

Throughout the execution of the method 300, the electronic processor 102 is running a classifier. In the embodiment described, the classifier is the single object classifier 114 trained to detect the face and upper torso region of a person. The single object classifier 114 is loaded and runs as part of a video processing or other application (for example, the video analytics engine 113) on the mobile media device 100. For example, the mobile media device 100 may be a body-worn camera recording and processing video using the video analytics engine 113 and the single object classifier 114. After the single object classifier 114 is loaded (for example, by starting an application using the video analytics engine 113), and while the single object classifier 114 is running, the electronic processor 102 executes the method 300 to detect the object of interest using a hue saturation value.

At block 310, the electronic processor 102 determines a hue saturation value range. In some embodiments, the electronic processor 102 receives a user input indicating a particular hue saturation value range (for example, corresponding to an orange color or color range). In another embodiment, the electronic processor 102 automatically selects a hue saturation value range from the database 101, for example, a suspect description in an incident report received from a computer aided dispatch system. The hue saturation value range corresponds to a color or range of colors, depending on how large the range is. The range is determined, for example, based on how precisely the color being sought is known. For example, the color of a shirt worn by a suspect may have been reported as "blue" by a witness, or it may have been determined from a high-definition video image of the suspect. In some embodiments, the hue saturation value range is adjusted based on environmental factors that may affect how the color of the object of interest is perceived, such as, for example, whether the mobile media device 100 is capturing images indoors, outdoors, during the day, or at night. Because in this example the object of interest is a person wearing an orange shirt, the hue saturation value range is determined based on the color orange. In some embodiments, the hue saturation range is dynamic, and can be changed by subsequent user inputs.

At block 320, the electronic processor 102 receives a digital image (for example, the image 200) including one or more objects. One of the objects may be the object of interest. In this example, the object of interest is the face 215 of a person wearing an orange shirt 216. As shown in the image 200 of FIG. 2, the digital image 200 may include other objects, some of which are similar to the object of interest. For example, the image 200 also includes faces 203, 207, 211 of three other people wearing shirts 204, 208, 212. In one embodiment, the digital image is captured by the image sensor 112 and received by the electronic processor 102. In other embodiments, the digital image is received from a remote camera.

Returning to FIG. 3, at block 330, the electronic processor 102 (for example, using the single object classifier 114) detects a macroblock (for example, the macroblock 214) from the digital image that is associated with the object of interest. Macroblock detection is done without reloading the single object classifier 114. The macroblock 214 is detected, for example, by a neural network using the single object classifier 114 in the conventional or sub-sampling layers during feature extraction. The single object classifier 114 is used to detect an object, for example, a face. However, as described below, prior to making an assertion of detection, the single object classifier 114 performs a hue saturation value check on a target region of the macroblock 214.

At block 340, the electronic processor 102 determines a target region within the macro-block 214. The target region may be located at different locations within the macroblock 214. For example, when a person being sought is wearing a particular color shirt, the target region is placed below the detected face. In the example illustrated in FIG. 4, the target region 410 is chosen to be in the bottom of the macro-block 214 in order to detect the color of the shirt worn by the person having the face 215. In another example, the sought-after person may be wearing a particular color of hat, which would place the target region near the top of the macro-block 214, above the detected face 215. In some embodiments, the target region may be a smaller region, relative to the size of a region used to detect an article of clothing. For example, such smaller target regions may be used to detect the color of a person's eyes, a tattoo, a mole, another physical feature of a particular color, a logo or patch on an a larger article of clothing, an article of jewelry worn by a person, similar smaller-sized objects of a particular color, or a smaller area of a particular color within a larger area of a different color. In some embodiments, the target region is determined based on receiving a user input. For example, the user of the mobile media device 100 may indicate that the sought-after person is wearing an orange shirt, is wearing a black hat, has blue eyes, or some other descriptive feature, which can be used by the electronic processor 102 to determine the target region. In another embodiment, the target region may be retrieved from the database 101. For example, the target region may be part of an incident record in a computer-aided dispatch system.

Returning to FIG. 3, at block 350, the electronic processor 102 determines a quantity of pixels in the target region 410 having a hue saturation value within the hue saturation value range. In this example, the electronic processor looks at each pixel in the target region 410 to determine whether it is orange. That is, the electronic processor 102 determines whether a pixel's hue saturation value falls within the hue saturation range determined at block 310, which is a range around and including the color orange.

At block 360, the electronic processor 102 determines whether the quantity of pixels exceeds a threshold. The threshold may be determined experimentally and is set such that it is more likely than not that an orange shirt is present in the macroblock 214. In some embodiments, the threshold is a percentage of the total pixels in the target region 410. Detection thresholds may be changed dynamically without requiring a re-initialization of the image detection system. In some embodiments, the electronic processor 102 receives the threshold from a user input.

Figure 5:
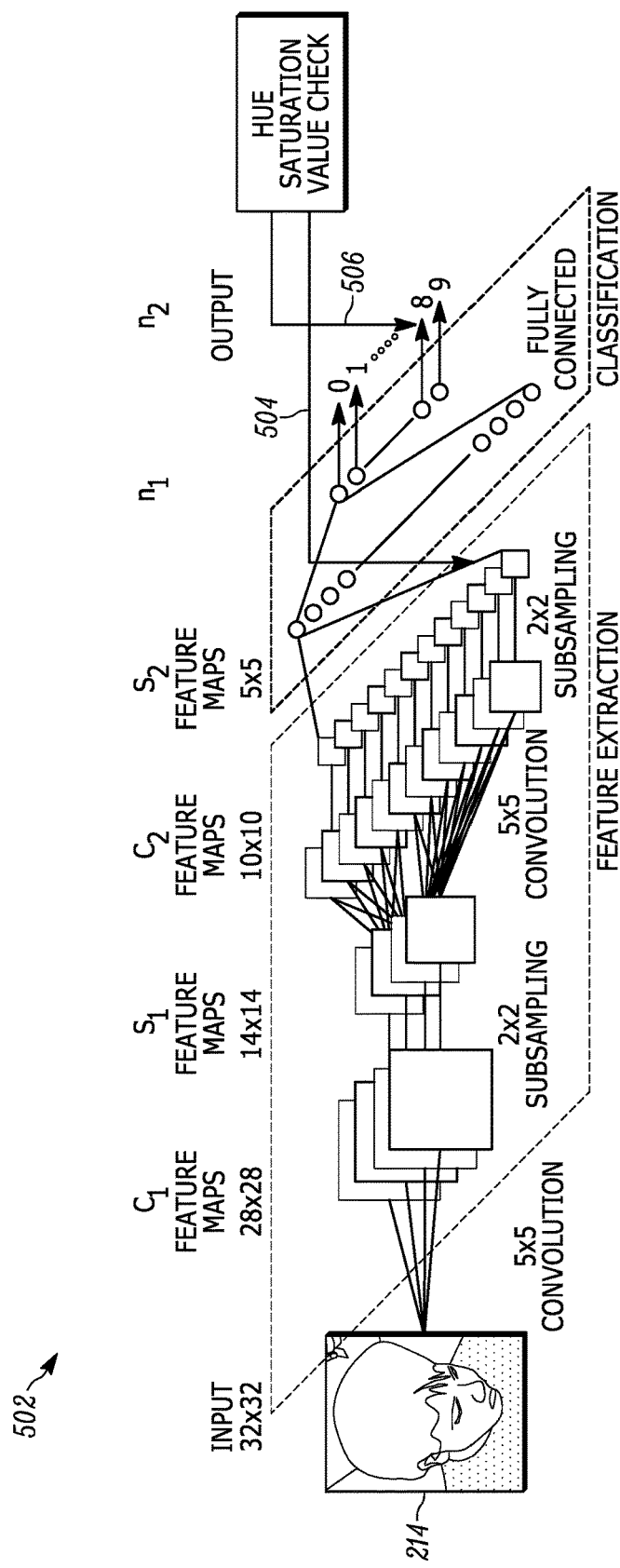
FIG. 5 illustrates a neural network performing object detection on a macroblock in accordance with some embodiments.

At block 370 when the quantity of pixels exceeds the threshold, the single object classifier 114 completes the object classification process for the macroblock 214, and indicates that it has detected the object of interest (in this example, a person who is wearing an orange shirt). The hue saturation check, described above with respect to block 350 of the method 300, takes place at some point prior to full classification of the object in the macroblock by the single object classifier 114. In some embodiments, the hue saturation check is performed by the single object classifier 114 after feature extraction, but before the classification layer. In other embodiments, the hue saturation check is performed after the classification layer, but before the output layer. For example, FIG. 5 illustrates a neural network 502 performing object detection on the macroblock 214. As illustrated in FIG. 5, the hue saturation value check may take place after the sub-sampling of the feature extraction section, and prior to the classification section (at 504). Optionally, the check can also be applied after the fully connected nodes, but prior to finalizing the output (at 506). Returning to FIG. 3, when the pixel quantity exceeds the threshold, the electronic processor 102 determines that the object, if identified, may be the object of interest based on the hue saturation value, and thus completes the classification process.

In some embodiments, in response to completing the object classification of the macroblock (that is, detecting the object of interest); the electronic processor 102 presents an indication that the object of interest has been detected on the display 110. The indication may be graphical, text-based, or both. In some embodiments, the electronic processor 102 may use augmented reality to indicate the object of interest on a live video stream that includes the object of interest.

At block 380, when the quantity of pixels fails to exceed the threshold, the electronic processor 102 discards the macroblock. In some embodiments, discarding the macroblock means stopping the classification process. Blocks 310 through 370 were described above with respect to the macroblock 214, which included the object of interest. Where blocks 310 through 360 performed for macro-blocks 202, 206, or 210, where there was no orange shirt, classification of those macro-blocks would stop at block 380.

As shown in FIG. 3, whether or not an object is detected, or classification of a macroblock is stopped, the method 300 may begin again at block 310 by determining a hue saturation value range. The hue saturation value range may remain constant, or it may change (for example, in response to a user input indicating a new hue saturation value range). In either case, the single object classifier 114 continues detecting and classifying objects without the need to be reloaded. Accordingly, the same single object classifier 114 may be used repeatedly to look for similar objects (for example, a person) with different colors in different target regions. For example, the single object classifier 114 may begin looking for a person wearing an orange shirt, but then may be instructed to look for a person with a blue shirt. By using the method 300, a single object classifier may be efficiently used to detect objects having particular color variations, without the need for retraining.

Figure 6:
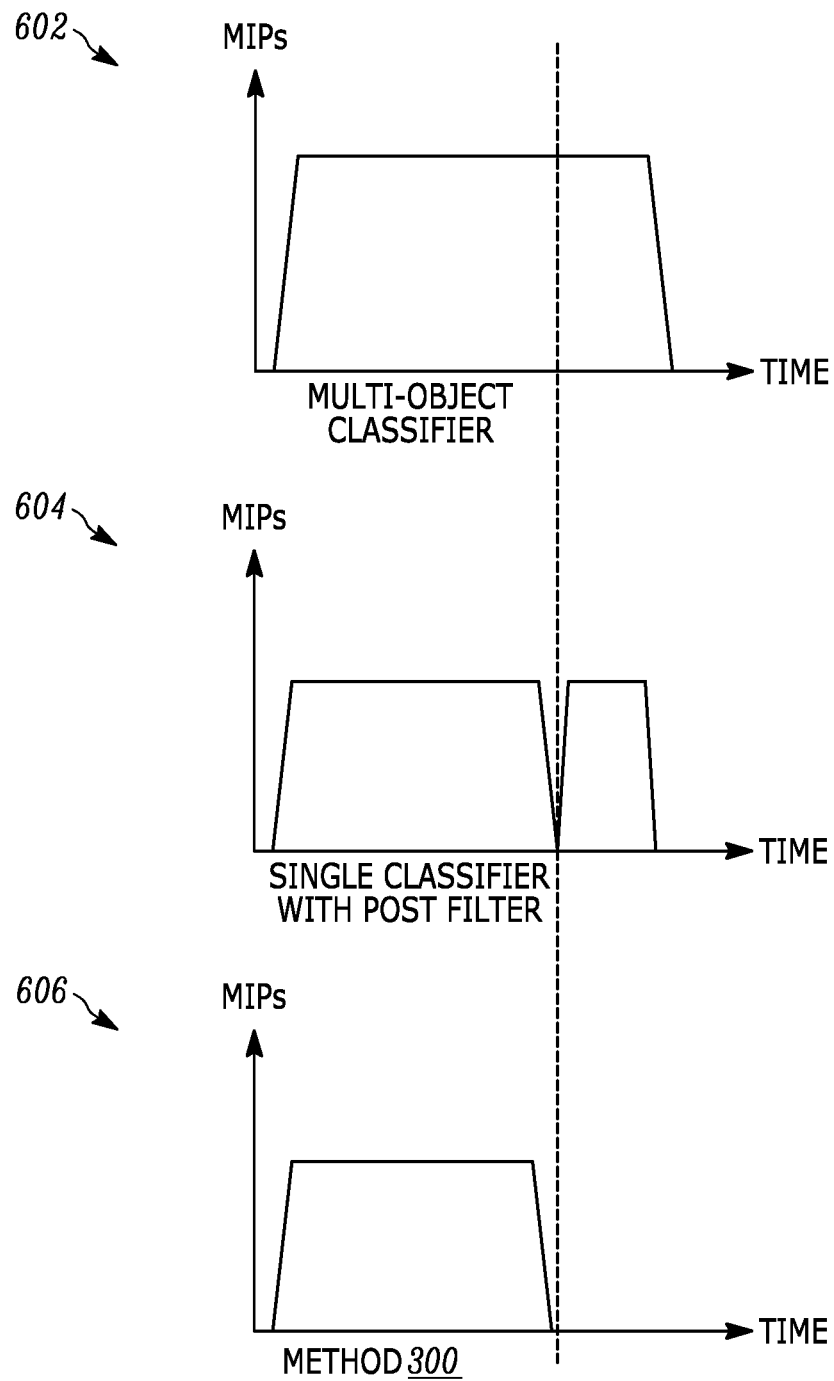
FIG. 6 illustrates the CPU usage and the time required to classify an object of interest using in accordance with some embodiments.

When the threshold is not met, the classification process is not completed because the object, no matter what it is, does not include the desired color in the target region. Accordingly, the single object classifier 114 saves time and cycles by not fully processing macro-blocks that cannot match the object of interest. FIG. 6 includes charts 602, 604, 606 illustrating the CPU usage (in MIPs) and the time required to classify the same object of interest using a multi-object classifier, a single classifier with a post filter, and the method 300, respectively. The object of interest is an object having a particular color in a particular region, such as, for example, the person wearing an orange shirt described above. As shown in chart 602, the multi-object classifier takes more time and more CPU usage to detect an object of interest than the method 300, shown in chart 606. Similarly, using a single classifier with post filtering, shown in chart 604, takes more time than the method 300 due to the serial calculation of filtering after the initial object detection. Because the method 300 performs a hue saturation check prior to the classifier completing detection, it eliminates the need to run multiple object classifiers or perform post-filtering; it results in a more efficient object classifier. The object classifier may thus be run on the edge of a network (that is, in the mobile media device 100), without having to send the video to another device on the network for processing. This reduces the bandwidth usage of the network and the latency associated with object detection and classification.

In the example described above, the method 300 was used to detect a person wearing an orange shirt. The method 300 may be similarly used to detect a person wearing a hat or other clothing item of a particular color. In other embodiments, the method 300 may be used for detecting color variances in other objects. For example, the method 300 may be used to detect an automobile that has a small area of discoloration (for example, from being in a traffic accident). In some embodiments, multiple hue saturation values, pixel count thresholds, and target regions may be used. For example, the method 300 may be used to detect a person with brown eyes, wearing a blue shirt and a black hat. In another example, a sought-after person is wearing a blue hat with a red "C" on it. In that situation, the electronic processor 102 determines a first target region near the top of the macroblock having a blue hue saturation value and a second, smaller target region within the first target region having a red hue saturation value.

It should be noted that a plurality of hardware and software based devices, as well as a plurality of different structural components may be utilized to implement the invention. In some embodiments, the invention provides a software application that is executable on a personal computing device, such as a smart phone, tablet computer, smart watch, a portable radio, a body-worn camera device, and the like. In some embodiments, the software application may be stored and executed by a remote computing device, such as a server. In particular, the software application may be executed by a server, and a user can access and interact with the software application using a mobile media device. Also, in some embodiments, functionality provided by the software application as described above may be distributed between a software application executed by a user's portable communication device and a software application executed by another electronic process or device (for example, a server) external to the mobile media device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for inline object detection, the method comprising:
   determining, with an electronic processor running a single object classifier, a hue saturation value range;
   receiving a digital image including an object;
   detecting, without reloading the single object classifier, a macroblock from the digital image, the macroblock associated with the object;
   determining a target region within the macroblock, the target region located directly adjacent to the object;
   determining a quantity of pixels in the target region having a hue saturation value within the hue saturation value range; and
   when the quantity of pixels exceeds a threshold, completing object classification of the macroblock.

2. The method of claim 1, further comprising:
   when the quantity of pixels does not exceed the threshold, discarding the macroblock.

3. The method of claim 1, further comprising:
   determining a second hue saturation value range;
   determining, without reloading the single object classifier, a quantity of pixels in the target region having a hue saturation value within the second hue saturation value range.

4. The method of claim 3, further comprising:
   determining a second target region within the macroblock;
   determining, without reloading the single object classifier, a quantity of pixels in the second target region having a hue saturation value within the second hue saturation value range.

5. The method of claim 1, wherein determining a hue saturation value range includes one of receiving a user input indicating the hue saturation value range and retrieving the hue saturation value range from a database.

6. The method of claim 1, wherein determining a target region includes one of receiving a user input indicating the target region or retrieving the target region from a database.

7. The method of claim 1, wherein detecting a macroblock includes detecting a macroblock using the single object classifier.

8. The method of claim 1, wherein receiving the digital image includes receiving the digital image from an image capture device of a mobile media device.

9. The method of claim 1, further comprising:
   in response to completing object classification of the macroblock, presenting an indication that the object of interest has been detected on a display of the mobile media device.

10. A mobile media device for inline object detection, the mobile media device comprising:
    an electronic processor configured to
       provide a single object classifier,
       determine, with the single object classifier, a hue saturation value range;
       receive a digital image including an object;
       detect, without reloading the single object classifier, a macroblock from the digital image, the macroblock associated with the object;
       determine a target region within the macroblock, the target region located directly adjacent to the object;
       determine a quantity of pixels in the target region having a hue saturation value within the hue saturation value range; and
       when the quantity of pixels exceeds a threshold, complete object classification of the macroblock.

11. The mobile media device of claim 10, wherein the electronic processor is further configured to, when the quantity of pixels does not exceed the threshold, discard the macroblock.

12. The mobile media device of claim 10, wherein the electronic processor is further configured to:
    determine a second hue saturation value range;
    determine, without reloading the single object classifier, a quantity of pixels in the target region having a hue saturation value within the second hue saturation value range.

13. The mobile media device of claim 12, wherein the electronic processor is further configured to:
    determine a second target region within the macroblock;
    determine, without reloading the single object classifier, a quantity of pixels in the second target region having a hue saturation value within the second hue saturation value range.

14. The mobile media device of claim 10, wherein the electronic processor is further configured to:
    receive a user input indicating the hue saturation value range and retrieve the hue saturation value range from a database.

15. The mobile media device of claim 10, wherein the electronic processor is further configured to receive a user input indicating the target region.

16. The mobile media device of claim 10, wherein the electronic processor is further configured to retrieve the target region from a database.

17. The mobile media device of claim 10, wherein the electronic processor is further configured to detect a macroblock using the single object classifier.

18. The mobile media device of claim 10, wherein the electronic processor is configured to receive the digital image from an image capture device.

19. The mobile media device of claim 10, further comprising:
    a display;
    wherein the electronic processor is further configured to, in response to completing object classification of the macroblock;

present on the display an indication that the object of interest has been detected.

20. A non-transitory computer-readable medium including instructions executable by an electronic processor to perform a set of functions, the set of functions comprising:
- determining, with the electronic processor running a single object classifier, a hue saturation value range;
- receiving a digital image including an object;
- detecting, without reloading the single object classifier, a macroblock from the digital image, the macroblock associated with the object;
- determining a target region within the macroblock, the target region located directly adjacent to the object;
- determining a quantity of pixels in the target region having a hue saturation value within the hue saturation value range;
- when the quantity of pixels exceeds a threshold, completing object classification of the macroblock; and
- when the quantity of pixels does not exceed the threshold, discarding the macroblock.

* * * * *